United States Patent [19]

Chia et al.

[11] Patent Number: 5,509,052
[45] Date of Patent: Apr. 16, 1996

[54] BASE STORAGE OF HANDSET'S BASE REGISTRATIONS

[75] Inventors: Song C. Chia, Singapore, Singapore; Simon M. L. Tsang, Laguna City, Hong Kong

[73] Assignee: Motorola, Inc., Schaumburg, Ill.

[21] Appl. No.: 248,971

[22] Filed: May 25, 1994

[51] Int. Cl.⁶ ........................................ H04G 7/38
[52] U.S. Cl. ................ 379/61; 379/58; 379/60; 455/332
[58] Field of Search ................ 379/58, 60, 61; 455/33.2, 54.1, 54.2

[56] References Cited

U.S. PATENT DOCUMENTS

| | | | |
|---|---|---|---|
| 4,876,738 | 10/1989 | Selby | 455/54.1 |
| 5,212,822 | 5/1993 | Fukumme et al. | 455/33.2 |
| 5,305,466 | 4/1994 | Taketsugo | 455/54.1 |

*Primary Examiner*—Dwayne D. Bost
*Attorney, Agent, or Firm*—Juliana Agon; John Rauch

[57] ABSTRACT

A CT-2 base's intelligence (36) is enhanced by having a handset (12) transmit (418) its base registration history to the base station (24) such that the base can determine (724) whether the handset is correctly registered. The handset (12) requests (606) a link with any one of the previously registered base stations recorded in the base registration history by transmitting a link request containing the handset ID and any one of the previously recorded base IDs from the base registration history. This single base ID need not necessarily be the base station identification of the currently registered base station. The base station then determines (724) whether the one base station identification matches one member of the base registration history for the associated handset identification. In response to a match, the base transmits (712) the link grant to the handset.

6 Claims, 6 Drawing Sheets

BASE STORAGE OF HANDSET' S BASE REGISTRATIONS

TECHNICAL FIELD

This invention relates in general to portable or cordless telephone systems and more specifically to the registration and call set-up of these systems.

BACKGROUND

A portable telephone system, such as the second-generation digital cordless telephony (CT2), has multiple transceivers which are located at a call point station or base station known as a telepoint. This telepoint base station can be public and accessible by anyone fulfilling its requirements or the base station can be private, such as one in a private residence, home, office, hostel or other locations where there is a limited number of users. These transceivers allow persons using portable or wireless telephones or handsets to access a link on a communication resource, such as an available radio frequency (RF) channel. In accordance with a call set-up process, the channel is allocated by one of the transceivers to the public service telephone network (PSTN) after an initial registration process has been completed.

In the private environment, registration is the process where the user manually keys up a non-registered base station to initiate registration and commands the handset to register itself to the non-registered base station. According to the Common Air Interface (CAI) standard that the CT2 system follows, and for double protection, each base station has a unique identification number "base ID" and the portable telephone or handset also has a unique identification "handset ID." During this registration process both the handset and the base station exchange identification such that each will have each other's identification stored in its memory. Hence, the "handset ID" is stored in the base station and the "base ID" is stored in the portable telephone. In other words, both identification numbers are stored in both locations.

After the handset has successfully registered itself to the now registered base station, it can then use the registered base station to make (or receive) phone calls in tile call set-up process. Before allowing a user of the handset to place a call from the registered base station, the user has to select and use a particular base identification (base ID) as the link ID (LID) in a link request, during the CT2 call set-up process. Conventionally, to establish this link from the handset to one of the base station's transceivers to remotely connect with the PSTN, the portable telephone uses the "base ID" as the LID to request for a link. The base station, upon recognizing its own "base ID", would grant a link to the portable telephone. Hence, the user has to manually select the correct "base ID" to link up to the right base. If the user has roamed from one base station to another, this LID entering process can be quite tiresome especially since the "base ID" is a four digit hexadecimal number.

The following is an example of the current CT2 call set-up process:

Under the following given conditions:
Portable telephone ID=1234
Base station 1 base ID=5678
Base station 2 base ID=9876
Base station 3 base ID=4321

Assuming the portable telephone already has registered with base stations 1 and 2, stored in the portable telephone's memory is thus the following information:
Registration slot 1 : 5678
Registration slot 2 : 9876

The portable telephone is now registering to base station 3. Before registration, base station 3 does not have the identification for portable telephone 1234. After registration, Base station 3 has the following information stored in its memory:
Portable telephone 1234
Base ID 4321

And the portable telephone has the following information stored in its memory:
Registration slot 1: 5678
Registration slot 2: 9876
Registration slot 3: 4321

Assuming the portable telephone display is currently showing the contents of memory registration slot 1, which is the base ID 5678, because the user had just previously gone back to base station 1 to make a call. Assuming also, the user has now moved to base station 3 to make another call and thus is requesting a link with base station 3. If the user does not change the handset's current memory registration display slot, still showing 5678, when base station 3 receives the link request from portable telephone 1234, base station 3 will not recognize the LID of 5678 as a valid base ID request, even though base station 3 recognizes the portable telephone as one of it's registered telephone. Therefore, the link request is not accepted and a link grant is not transmitted. Only when the user changes the handset's current memory registration display slot to show 4321, will base station 3 recognize the LID as a valid base ID request in order to transmit a link grant to the handset 1234.

Accordingly, there is a need to make the call set-up process more user friendly by allowing a handset to place a call from a registered base station without having to select and use a particular base identification as the link ID during the link request in a CT2 communication system.

SUMMARY OF THE INVENTION

Briefly, according to the invention, there is provided an apparatus and method of CT-2 base intelligence enhancement by having a handset transmit its base registration history to the base station such that the base can determine whether the handset is correctly registered.

DETAILED DESCRIPTION OF THE PREFERRED EMBODIMENT

Figure 1:
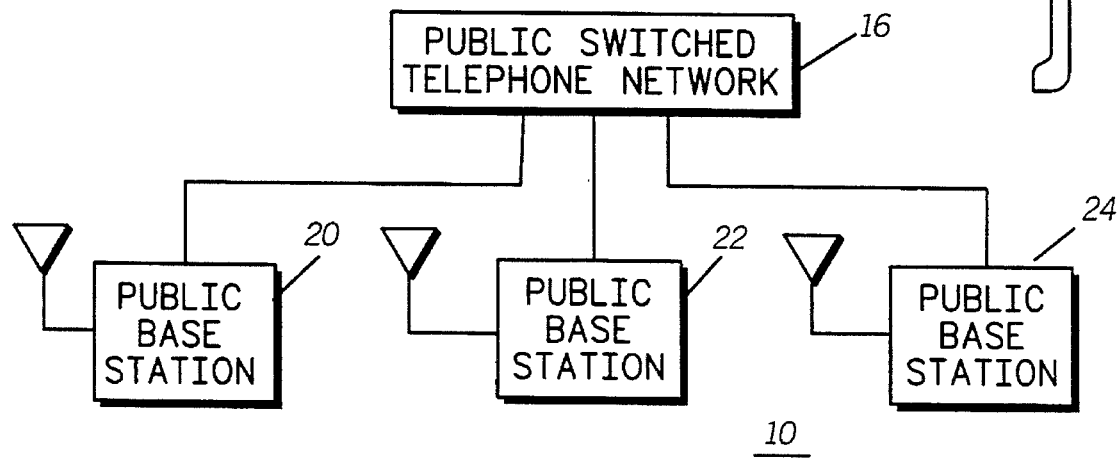
FIG. 1 shows a cordless telephone system in accordance with the preferred embodiment of the present invention.

Referring to FIG. 1, a communication system 10 for providing services to a plurality of subscribers or users (not shown) comprises a plurality of public or private base stations or CT2 call point stations 20, 22 and 24 and a plurality of communication units, such as wireless mobile subscriber units or cordless telephones (represented by a handset 12). A landline telephone resource 16, such as a Public Service Telephone Network (PSTN) or a Private Access Branch Exchange (PABX) allows subscribers to communicate with other telephone users, landlined or otherwise. Other private systems include a key system, or a private branch exchange (PBX).

Each subscriber can communicate with the PSTN 16 via the network of public base stations 20, 22 and 24. In this system, a voice connection is established by RF transmission from the cordless telephone handset 12 via the base station or fixed device 20, 22 or 24 to a telephone set not shown (but accessible by the public switched telephone network 16).

Figure 2:
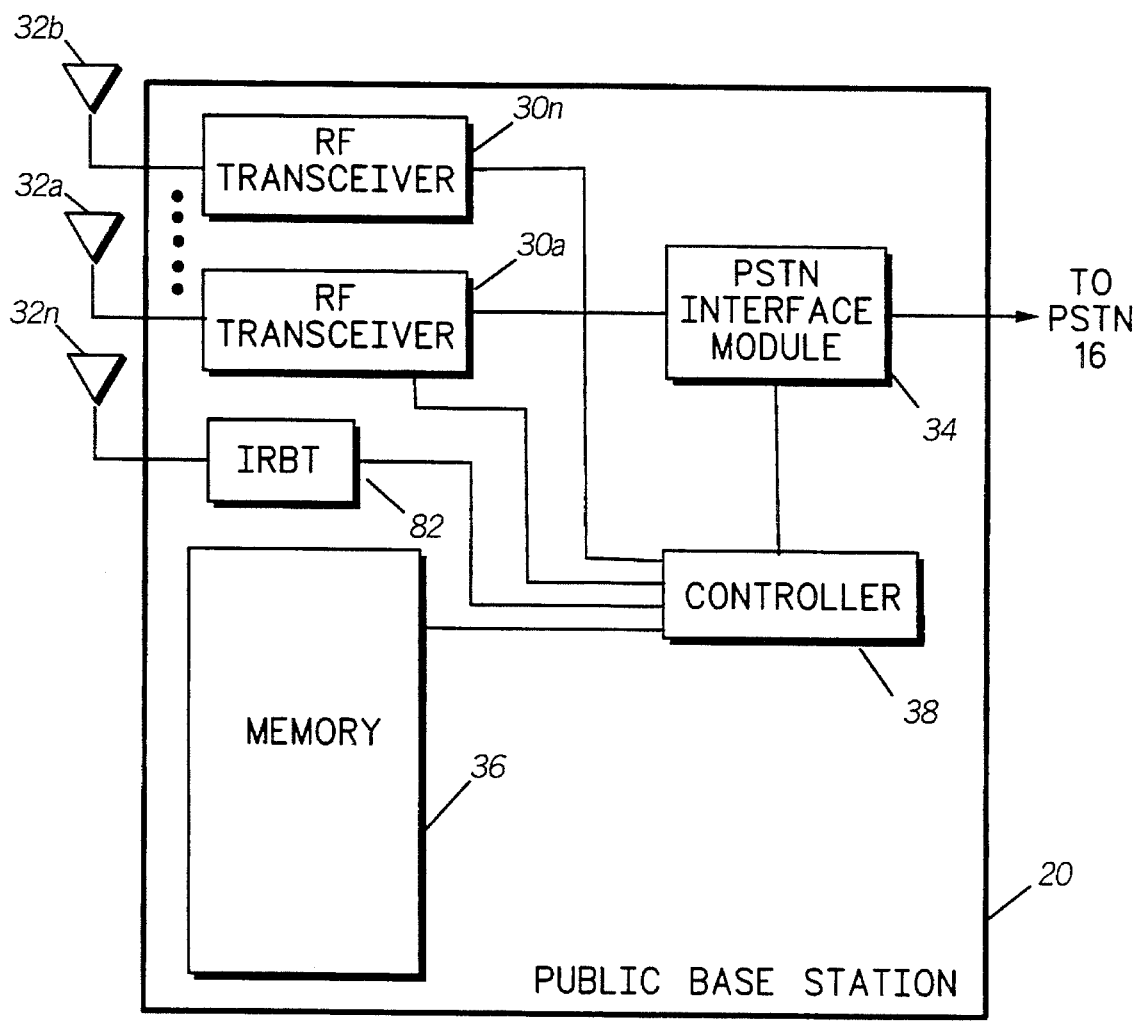
FIG. 2 shows a basic block diagram of a base station of FIG. 1 in accordance with the preferred embodiment of the present invention.

Referring to FIG. 2, a base station (or wireless phone booth or telepoint) 20, capable of receiving calls from the portable telephones 12, in accordance with the invention is shown in block diagram form. Each of the physical components of the wireless phone booth 20 represented by a block is conventional. A plurality of antennas 32a–n are each coupled to at least one RF transceiver or CT2 multi-channel radio frequency (RF) transceiver 30a–n for communication between the portable or wireless telephone handset 12, which includes a corresponding radio frequency transceiver 50 (see FIG. 3). Specifically, one of the five channels of eight CT2 multi-channel RF transceivers 30a–n provide one of forty duplex channels that are dynamically allocated when a limited number of communication resources, such as an RF link or available channel is requested. The base station 20 also includes a memory 36 for storing information including memory templates or registration slots containing information relating to subscribers such as their address codes or identifications and a controller or channel monitor 38 (e.g., a conventional microprocessor) for processing the information received from the transceivers 30a–n and/or the information stored in the memory 36. A part of the memory 36 may also provide call authentication and verification statistic functions.

A communication resource allocator, such as a PSTN interface module 34 provides an interface between the public telephone network 16 and the transceivers 30a–n via phone lines coupled between the transceivers 30a–n and the PSTN interface module 34. The CT2 multi-channel transceiver activity is monitored by the controller as a channel usage monitor 38. The channel usage monitor controller 38 determines whether or not the CT2 multi-channel transceiver 30a–n is utilizing all of its predetermined number of phone lines. When such a phone line is granted by the controller 38, a dial tone will also be transmitted to the handset 12 by one of the transceivers 30a–n.

Figure 3:
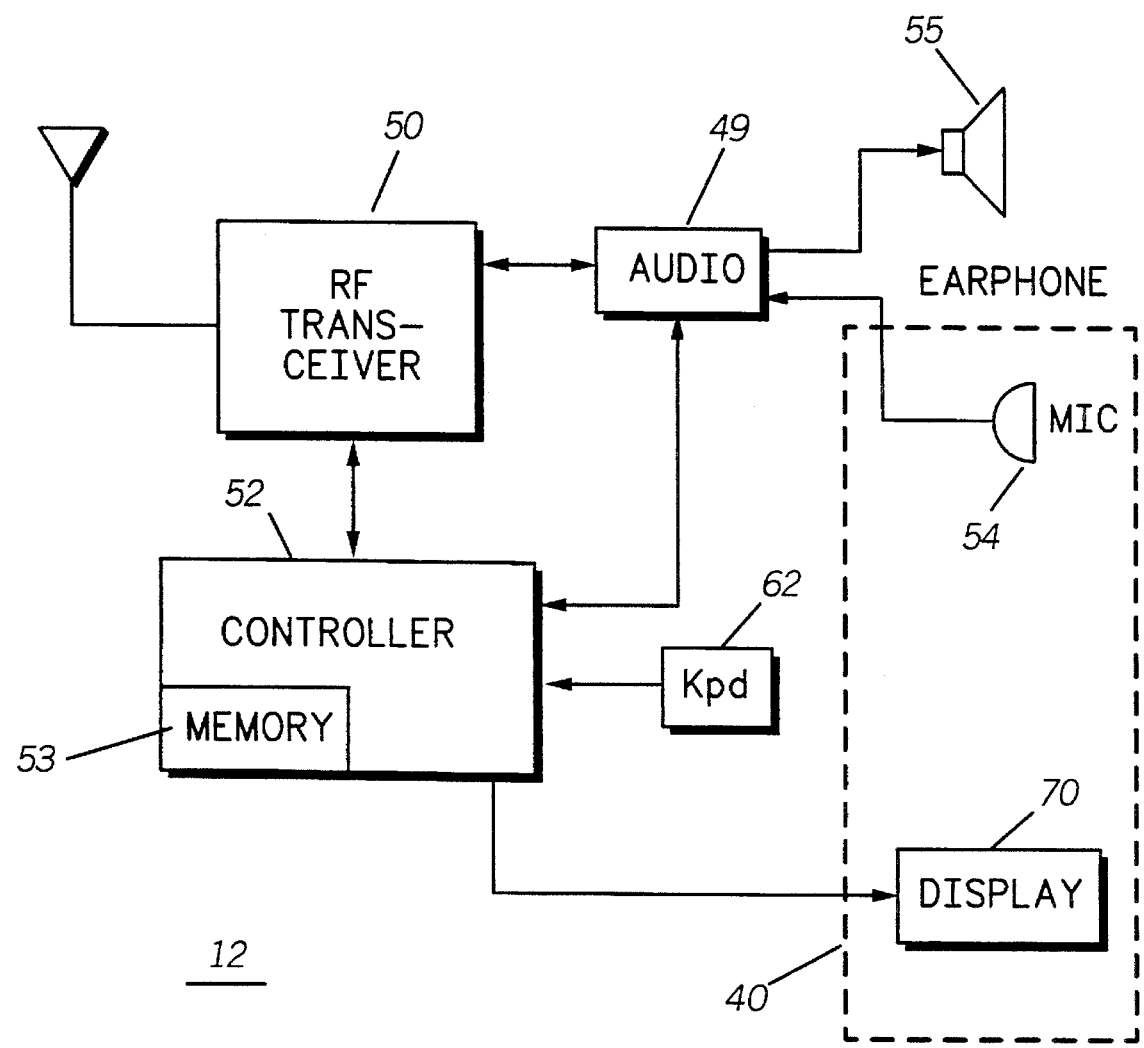
FIG. 3 shows a block diagram of a handset of FIG. 1 in accordance with the preferred embodiment of the present invention.

Referring to FIG. 3, a cordless handset 12 in accordance with the invention is shown. Basically, within the system 10 of FIGS. 1 and 2, the base station 20, 22 or 24 performs connection control based upon a request received from the handset 12. The base station 20, 22 or 24 further transmits data information to the handset 12. Operating as a means for requesting and subsequently receiving a dial tone for a phone line connection in the base station 20, the cordless telephone handset (or wireless mobile subscriber unit) 12 comprises a conventional radio transceiver 50. As the mastermind of the handset 12, a controller 52 includes memory 53 containing the address or subscriber unit ID number or other identification of the handset 12, and/or other system operation parameters. A keypad 62 allows the user to type commands or information requests to the public base station 20 such as requesting a phone line connection.

The cordless telephone handset 12 further comprises an audio section 49 connected to an earphone 55 and a microphone 54. A display 70 provides the user with the contents of a particular memory slot, as selected by an optional scroll button or other kind of a selector. An indicator 40, comprising the display 70 or the microphone 54, or some other suitable indication means, is responsive to the information gathered by the channel monitor controller 38 to indicate whether a certain operation has been successful, such as a call set-up process. The indicator may be an annunciator or a light that is observable on the handset 12, a synthesized voice message provided by the earphone 55, or a message or symbol displayed on the display 70 of the handset 12.

Referring to FIGS. 2 and 3, the memory elements 36 and 53 may be RAM, ROM or any type of digital information storage device, wherein the microprocessing devices, controlling the registration slots of the memory, may be a microprocessor may be any one from a family of known microprocessors, microcontrollers, or microcomputers. It may be appreciated by one of ordinary skill in the art that other radio functions not herein described may be provided by any suitable means, including the controller 52 and 38, which controls the entire operation of the radio handset 12 and base 20, respectively.

Figure 4:
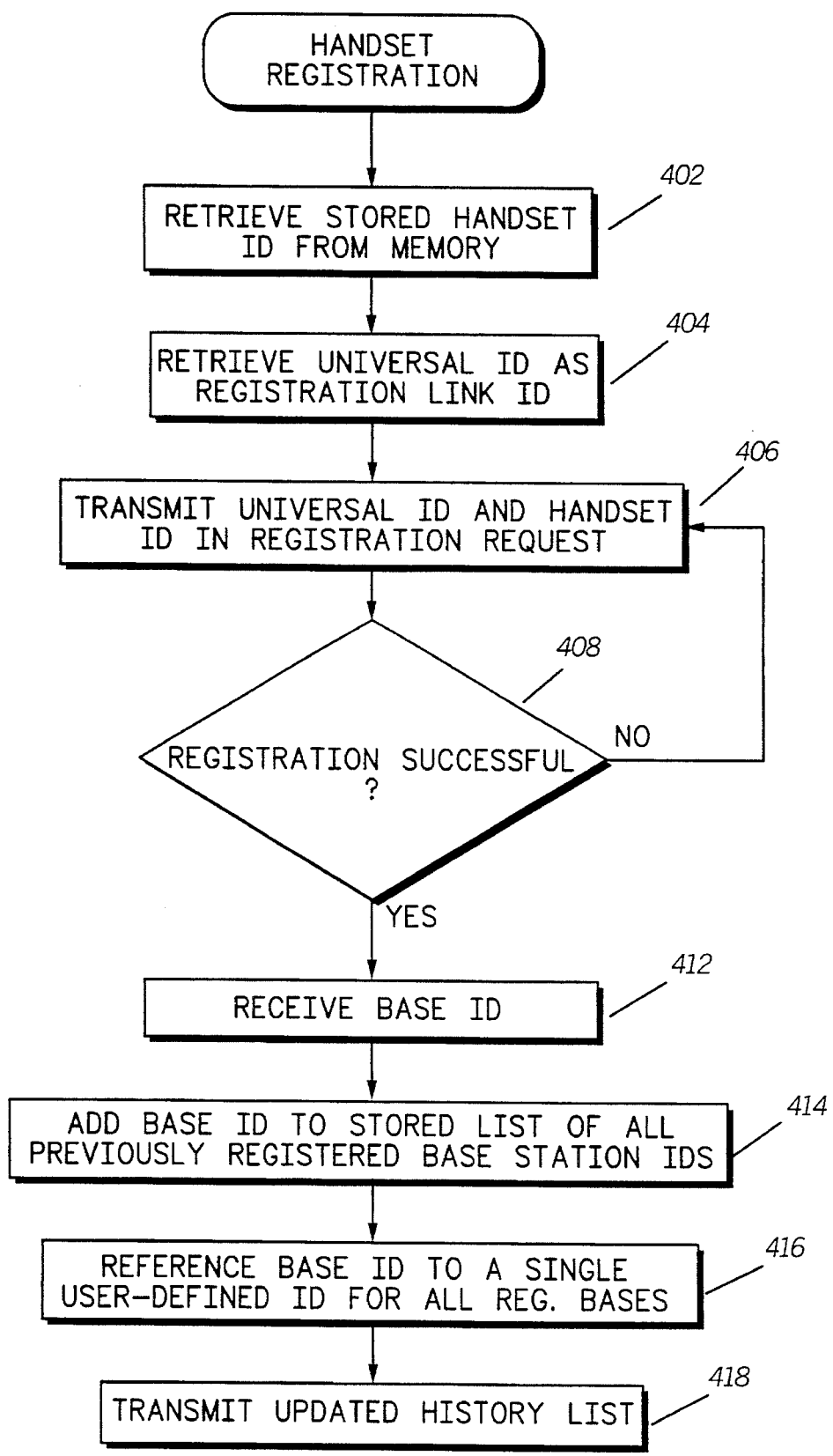
FIG. 4 shows a handset registration flow diagram, in accordance with the preferred embodiment of the present invention.

FIGS. 4–7 illustrate logic diagrams that may be used to implement the present invention. To initiate the registration process, the user has to manually key up a non-registered base station to be in the registration mode before the base can scan for the registration link identification. Referring to FIG. 4, the handset retrieves (402) its handset identification stored in memory 12 to initiate the registration process. Using a predefined universal ID (404) as registration link identification with any base, the handset transmits (406) a registration request containing the universal base ID and its own handset ID to the base already keyed to be operating in a registration mode. Upon successful registration (408), the handset receives a base identification (412) from the base station. The handset's controller 52 adds (414) the base identification to a stored history list of all previously registered base station identifications to transform the base station's status to a currently registered base station.

To complete the registration process, the handset transmits (418) to the just registered base station an updated history list of all the previously registered base station identifications including the base station identification of the currently registered base station.

Figure 5:
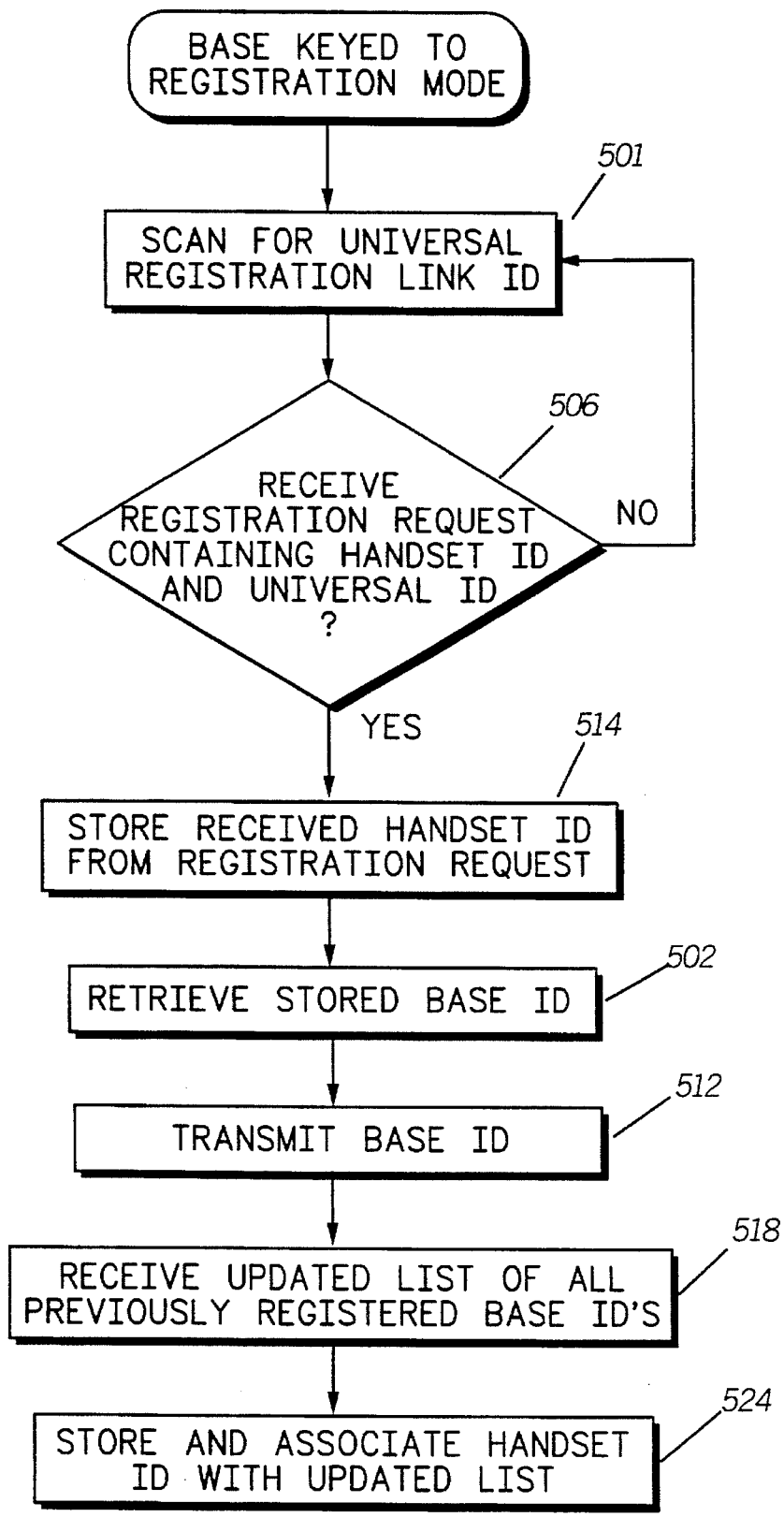
FIG. 5 shows a base registration flow diagram, in accordance with the present invention.

Meanwhile, referring to FIG. 5, the base station after being keyed scans (501) for the universal registration link identification. If the base receives (506) the universal registration link identification and the handset ID, from the registering handset, the base station stores (514) the handset ID in memory 36 before retrieving (502) from memory and transmitting (512) the base identification to handset. To complete the information exchange, the base receives (518) the updated history list of all previously registered base station identifications from the handset. Finally, the base stores in memory 36 and associates (524) the handset identification with the updated history list of all previously registered base station identifications.

Figure 6:
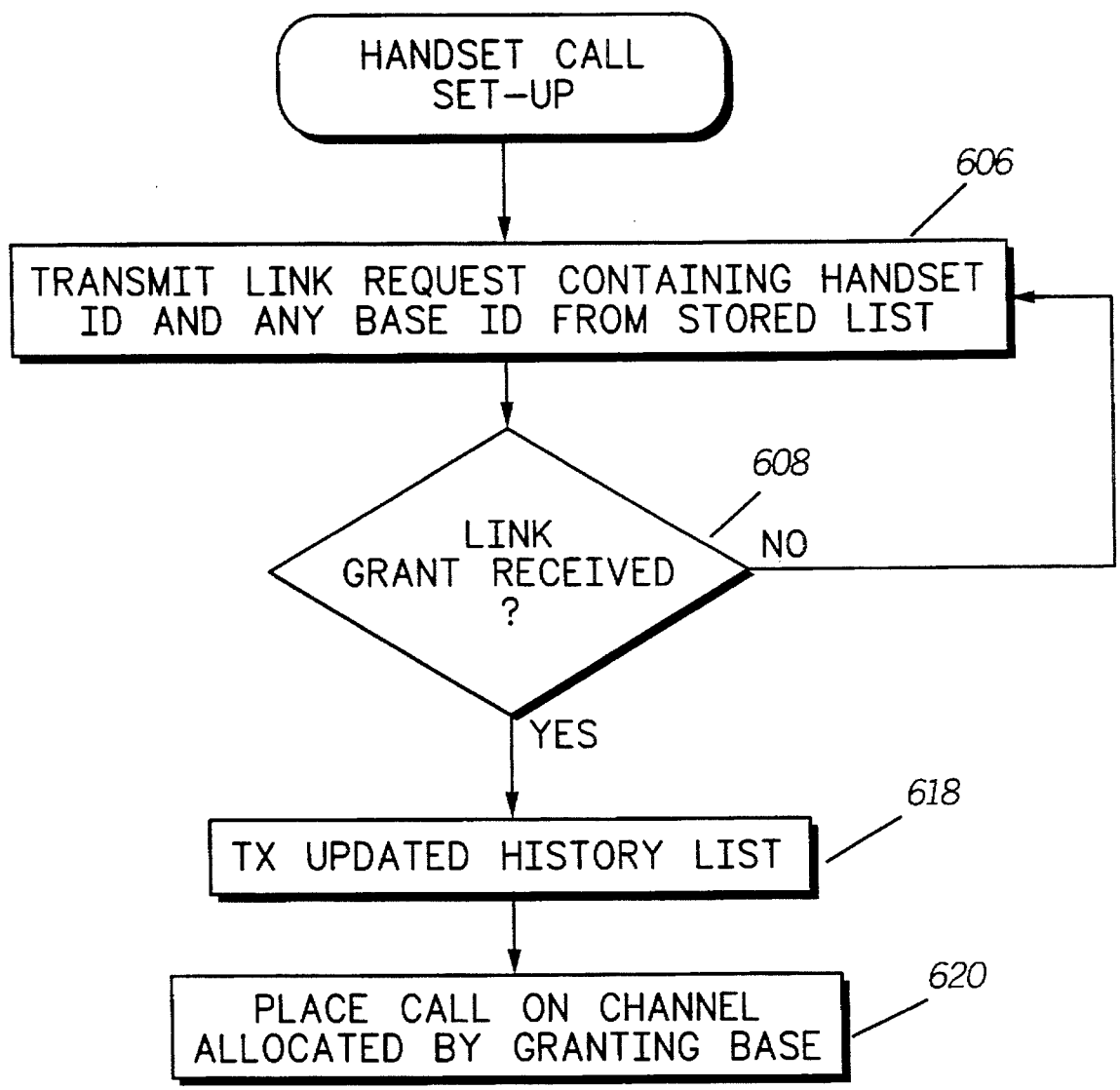
FIG. 6 shows a handset call set-up flow diagram, in accordance with the preferred embodiment of the present invention.
Figure 7:
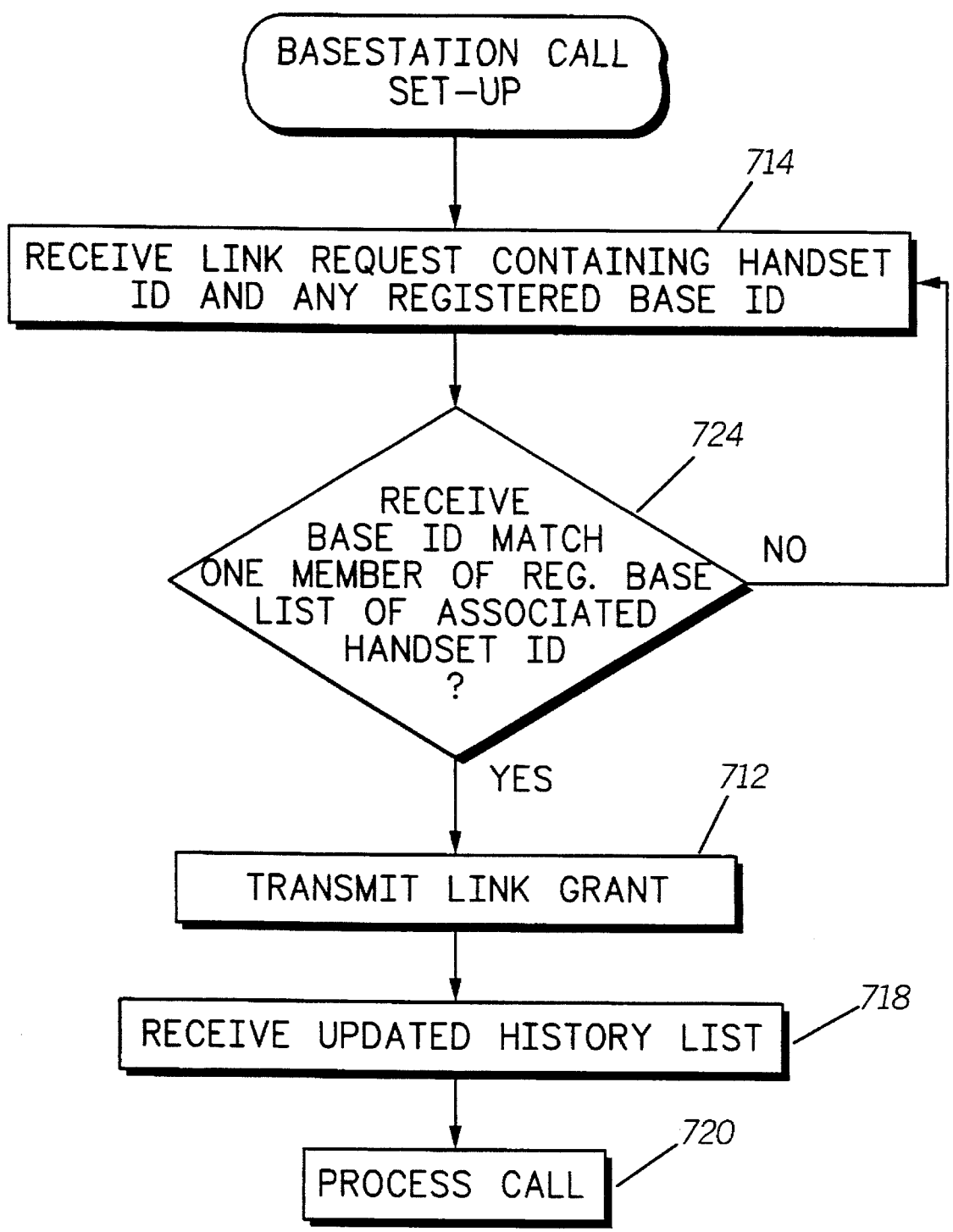
FIG. 7 shows a base call set-up flow diagram, in accordance with the preferred embodiment of the present invention.

Upon successful registration, the handset can use the registered base station to make outgoing phone calls in the Call Set-Up Process of FIGS. 6–7. However, before making a call, the handset has to wait for both an RF link and a dial tone to happen before sending any message over the system 10. The dial tone is an indication that a phone line has been allocated by the base station.

Referring to FIG. 6 the handset call set-up process is similar to its registration process. The handset first requests (606) a link for a line connect with a desired already registered base station by transmitting a link request. The link request contains the handset identification and any of the base station identifications already stored from the history list of all previously registered base station identifications. Upon receiving a link grant (608) from the desired registered base station to enable the handset to place (620) the call from the granting base station, the handset transmits (618) its updated history list once again to the base station. The reception of the link grant would activate an optional indicator 40, such as a microphone 54, a display 70 or a light emitting diode (LED) (not shown) to indicate to the user that an RF link has been established, if desired.

Meanwhile, in the base station process flow of FIG. 7, the base station receives (714) the link request containing the handset identification and one base station identification. The base's controller 38 determines (724) whether the one base station identification matches any contained in the updated history list of all previously registered base station identifications for that received handset identification. In response to a match from the determining step of 724, the base station controller 38 senses the link request logic signal coming to it and initiates the radio link. After the RF link has been established, the controller 38 transmits (712) a link grant signal out to the handset 12 to fully establish an RF link between the two. The handset is now ready to receive a telephone dial tone from the landline PSTN interface 34. Upon receiving the dial tone, which means that the RF link is established with the communication path fully connected to the landline telephone interface 34, the user of the handset could start dialing for communications.

Optionally, the controller could also reference (416) all of the previously registered base station identifications to a single user-defined base representation to make the base identification more user friendly. For example, the following is based on the same conditions of the previous example of the call set-up process for a user named "John", in accordance with the present invention:

Under the following given conditions:
Portable telephone ID=1234
Base station 1 base ID=5678
Base station 2 base ID=9876
Base station 3 base ID=4321
User defined ID="John"

Assuming the portable telephone has already registered with base station 1 & 2, therefore in the portable telephone, the list is such:
Registration slot 1: 5678="John"
Registration slot 2: 9876="John"

The portable telephone is now registering to Base station 3.

Before registration, base station 3 does not have any list for portable telephone 1234. After registration, the Base station 3 has a list as follows:

Portable telephone 1234 Base ID 5678 Base ID 9876 Base ID 4321

Assuming portable telephone display is at slot 1, which is "john" base ID 5678, and is requesting a link with base station 3. When base station 3 receives the link request from portable telephone 1234, it recognizes the portable telephone as one of it's registered telephone, and the LID which is 5678 as a valid base ID in it's list. Therefore, the link request is accepted, and a link grant is transmitted.

Before processing the call for the handset, the base station receives the updated history list once again from the handset to account for any new registration updates.

In this example, it will be assumed that the handset's ID is 123 and the three base stations ID' s are abc, def, and xyz respectively. After the handset registers with base station abc, the handset registration database in its memory 53 will contain abc. Meanwhile, base station abc has handset registration database as 123–abc.

Handset 123 then registers with base station def. The handset registration database now has abc and def while base station def has the handset registration database 123–abc, def in its memory 36. However, base station abc still has a handset registration database of 123–abc in its last updated memory 36. Because the base stations are not network together but function as private stand-alone equipment, base abc's memory has not been updated to 123–abc, def. The only way to update the handset registration database in base abc is to transmit the update when the handset next link up to the base station again for some activities, for example during call set-up.

Handset 123 next registers with base station xyz. The handset registration database now has abc,def,xyz while base station xyz has handset registration database as 123–abc,def,xyz. However, base station abc still has handset registration database as 123–abc, while base station def has handset registration database as 123–abc,def and not 123–abc,def,xyz.

Now if handset 123 uses base station def for call set-up activities then base station def will have an updated handset registration database which is 123–abc,def,xyz. The same will happen for base station abc if handset 123 uses base station abc for some RF activities.

In summary, the base station and handset exchange registration information for maintaining the handset registration history at the base station for facilitating a user's call set-up process. In effect, the handset identification is redefined to include all of its registered base stations.

What is claimed is:

1. A method of CT-2 handset link establishment for use in a CT-2 handset currently registered with one or more previously registered base stations, the method comprising the steps of:

transmitting a handset ID to a non-registered base station;

receiving from the non-registered base station a base ID corresponding to the non-register base station;

transmitting to the non-registered base station an updated list of the one or more previously registered base stations of the handset;

requesting a link with any one of the one or more previously registered base stations by transmitting to the non-registered base station a link request, the link request containing the handset ID and one base ID, the one base ID corresponding to the one or more previously registered base stations from the updated list of the one or more previously registered base stations, the one base ID not necessarily a base station identification corresponding to the non-registered base station; and establishing a communications link between the handset and the non-registered base station.

2. A method of allowing a handset to place a call from a currently non-registered base station in a CT2 communication system, the method comprising the steps of:

in the handset:

storing a handset identification;

manually keying up a non-registered base station and providing the handset identification to the non-registered base station;

receiving a base identification from the non-registered base station;

adding the base identification to a stored history list of all previously registered base station identifications to transform the base station status to a currently registered base station;

transmitting to the currently registered base station an updated history list of all previously registered base station identifications and a base station identification corresponding to the currently registered base station;

transmitting a link request to establish a link between the handset and any one of the previously registered base stations, the link request containing the handset identification and one base station identification corresponding to any one base station included in the updated history list of all previously registered base station identifications, the one base station identification not necessarily the base station identification of the currently registered base station; and receiving at the handset from the currently registered base station a link grant to establish a link from the handset to any one of the previously registered base stations to enable the handset to place the call from the currently registered base station; and in the base station:

storing the base station identification;

universally registering the handset identification with the base station in response to the handset identification;

receiving the updated history list of all previously registered base station identifications from the handset;

storing and associating the handset identification with the updated history list of all previously registered base station identifications;

receiving the link request containing the handset identification and the one base station identification;

determining whether the one base station identification corresponds to one member of the updated history list of all previously registered base station identifications for the associated handset identification; and in response to a match from the determining step, transmitting the link grant to the handset.

3. The method of claim 2, including the step of referencing all of the previously registered base station identifications to a single user-defined base representation.

4. A method of allowing a handset to place a call from a registered base station without having to select the registered base station and use the particular base identification as the link ID during link request in a CT2 communication system, the method comprising:

registration steps of;

in the handset:

storing a handset identification;

manually keying up a non-registered base station to be in the registration mode, to scan for registration link identification;

transmitting to the non-registered base station a registration request using a registration link identification;

receiving a base identification from the non-registered base station upon successful registration;

adding the base identification to a stored history list of all previously registered base station identifications to transform the non-registered base station to a currently registered base station;

referencing all previously registered base station identifications to a single user-defined base representation; and transmitting an updated history list of all previously registered base station identifications with the base identification of the currently registered base station;

in the base station:

storing the base station identification;

receiving the registration link identification from the handset and providing the non-registered base station identification to the handset for storage;

receiving the updated history list of all previously registered base station identifications from the handset; and storing and associating the handset identification with the updated history list of all previously registered base station identifications;

Call Set-Up steps of:

In the handset:

requesting a link with any one of the previously registered base stations by transmitting a link request, the link request containing the handset identification and one base station identification from the history list of all previously registered base station identifications, the one base station identification not necessarily the base station identification of the currently registered base station; and receiving a link grant from with any one of the previously registered base stations to enable the handset to place the call from the one of the previously registered base stations; and in the base station:

receiving the link request containing the handset identification and the one base station identification;

determining whether the one base station identification matches one member of the updated history list of all previously registered base station identifications for the associated handset identification; and in response to a match from the determining step, transmitting the link grant to the handset.

5. The method of claim 4, further comprising the handset Call Set-up step of transmitting an updated history list of all previously registered base station identifications with the handset identification and the base Call Set-up step of receiving the updated history list of all previously registered base station identifications with the handset identification.

6. A CT-2 base station comprising:

memory for storing it's own base station identification and an updated history list of all base stations previously registered to a handset;

a receiver for receiving a link request from the handset, the link request containing the handset identification and one base station identification, the one base station identification not necessarily it's own base station identification; and a controller for associating all of the base stations with which the handset previously registered to the handset and determining whether the one base station identification matches an identification for one member of the updated history list of all previously registered base stations for the associated handset identification.

* * * * *